US007229092B1

(12) United States Patent
Parker et al.

(10) Patent No.: US 7,229,092 B1
(45) Date of Patent: Jun. 12, 2007

(54) WALKING AID

(76) Inventors: John Charles Parker, 3837 S. 82 E Ave., Tulsa, OK (US) 74145; Zelpha Ruth Parker, 3837 S. 82 E Ave., Tulsa, OK (US) 74145

( * ) Notice: Subject to any disclaimer, the term of this patent is extended or adjusted under 35 U.S.C. 154(b) by 389 days.

(21) Appl. No.: 10/919,785

(22) Filed: Aug. 17, 2004

(51) Int. Cl.
*B62B 3/00* (2006.01)

(52) U.S. Cl. ................ 280/647; 280/47.34; 280/87.05; 280/47.11

(58) Field of Classification Search .................. 280/40, 280/43, 39, 47.34, 641, 650, 652, 651; 135/67, 135/65, 85; 297/5
See application file for complete search history.

(56) References Cited

U.S. PATENT DOCUMENTS 3,024,035 A * 3/1962 Tapiovaara ................ 280/47.4
3,074,734 A * 1/1963 Munson et al. ............. 280/641
3,168,328 A * 2/1965 Hill, Sr. ...................... 280/641
3,677,571 A * 7/1972 Maturo et al. .............. 280/654
3,992,038 A * 11/1976 Guadano, Sr. .............. 280/659
3,998,490 A * 12/1976 Lallave ....................... 297/243
4,023,825 A * 5/1977 Kassai ........................ 280/649
4,462,607 A * 7/1984 Nakao et al. ............... 280/644
4,549,748 A * 10/1985 Haley, Sr. ................... 280/641
4,643,211 A 2/1987 Morris et al.
4,722,538 A * 2/1988 Freyman .................... 280/5.32
4,759,559 A * 7/1988 Moulton ...................... 280/40
4,765,355 A 8/1988 Kent
5,046,748 A 9/1991 Oat-Judge
5,294,158 A * 3/1994 Cheng ........................ 280/641
5,348,336 A 9/1994 Fernie et al.
D367,251 S 2/1996 Ahlberg et al.
5,562,299 A * 10/1996 Morrissette ................ 280/652
5,603,517 A 2/1997 Lorman
5,647,602 A 7/1997 Nevin
5,716,063 A 2/1998 Doyle et al.
5,816,593 A 10/1998 Che
6,367,823 B1 * 4/2002 Miyagi .................... 280/47.34
6,413,168 B1 * 7/2002 McKendry et al. ......... 473/239
6,546,599 B2 * 4/2003 Pelt et al. ..................... 24/3.1
6,682,090 B2 * 1/2004 Chen .......................... 280/642
2002/0079663 A1 6/2002 Hallgrimsson et al.

* cited by examiner

*Primary Examiner*—Paul N. Dickson
*Assistant Examiner*—Bridget Avery
(74) *Attorney, Agent, or Firm*—Molly D. McKay

(57) ABSTRACT

A strong, light weight walking aid with optional seat that can be used to assist a person in walking and resting on the walking aid. The walking aid collapses so that it can be stored in a small space and the handle can be removed and reattached to make it even smaller. The walking aid is constructed of a double tube aluminum frame to make it strong without adding excess weight. It is provided with a padded, sure-grip handle and can be provided with braking mechanisms on some or all of the wheels.

20 Claims, 5 Drawing Sheets

WALKING AID

BACKGROUND OF THE INVENTION

1. Field of the Invention

The present invention relates to a light weight walking aid that can be used to assist a person in walking and can be provided with an optional seat that allows a person to be seated on the walking aid. The present invention collapses so that the walking aid can be temporary stowed in a small space when traveling via airplane, etc. and the handle can be placed in a storage configuration on the walking aid so that the walking aid can be stored in an even smaller space. The walking aid is constructed of a double tube frame to make the walking aid strong without adding excess weight. It can be provided with braking mechanisms on some or all of the wheels as a safety feature to prevent the walking aid from rolling out from under the person using the aid. The walking aid is provided with a padded handle to insure a secure grip on the handle by the person using the walking aid.

2. Description of the Related Art

People who have trouble walking or standing for long periods of time often find it useful to employ a walking aid to assist them in walking. Walking aids range from a simple stick or walking cane to the standard four legged walker that is commonly used in hospitals and nursing homes. People who need to use a walking aid are often prevented from traveling via airplane because their walker is too large and heavy to take onto the airplane with them and once on the airplane, there is no place to store the standard non-collapsible walker.

The present invention addresses this problem by providing a strong but very light weight walking aid that can be collapsed to stow into a small area and can be made even smaller by removing the handle and storing it on the walking aid.

The present invention is also provided with an optional seat that allows a person to be seated on the walking aid. The present invention is provided with optional braking mechanisms on some or all of the wheels as a safety feature to prevent the walking aid from rolling out from under the person who is using the aid. The wheels also prevent the walking aid from rolling in the event that the user falls. The walking aid is also provided with a padded handle to insure a secure grip on the handle by the person using the walking aid.

SUMMARY OF THE INVENTION

The present invention is a strong, light weight walking aid that can be used to assist a person in walking. An optional seat can be provided on the walking aid to allow a person to be seated on the walking aid. The present invention collapses so that the walking aid can be temporary stowed in a small space when traveling via airplane, etc. The collapsed invention can be made even smaller by removing the detachable handle and reattaching the handle to the walking aid in a storage configuration so that the walking aid can be stored in a very small space.

The walking aid is constructed of a double tube frame, preferable constructed of aluminum tubing, to make the walking aid strong without adding excess weight. It can be provided with braking mechanisms on some or all of the wheels as a safety feature to prevent the walking aid from rolling out from under the person using the aid. The walking aid is also provided with a padded handle to insure a secure grip on the handle by the person using the walking aid.

DETAILED DESCRIPTION OF THE PREFERRED EMBODIMENT THE INVENTION

Figure 1:
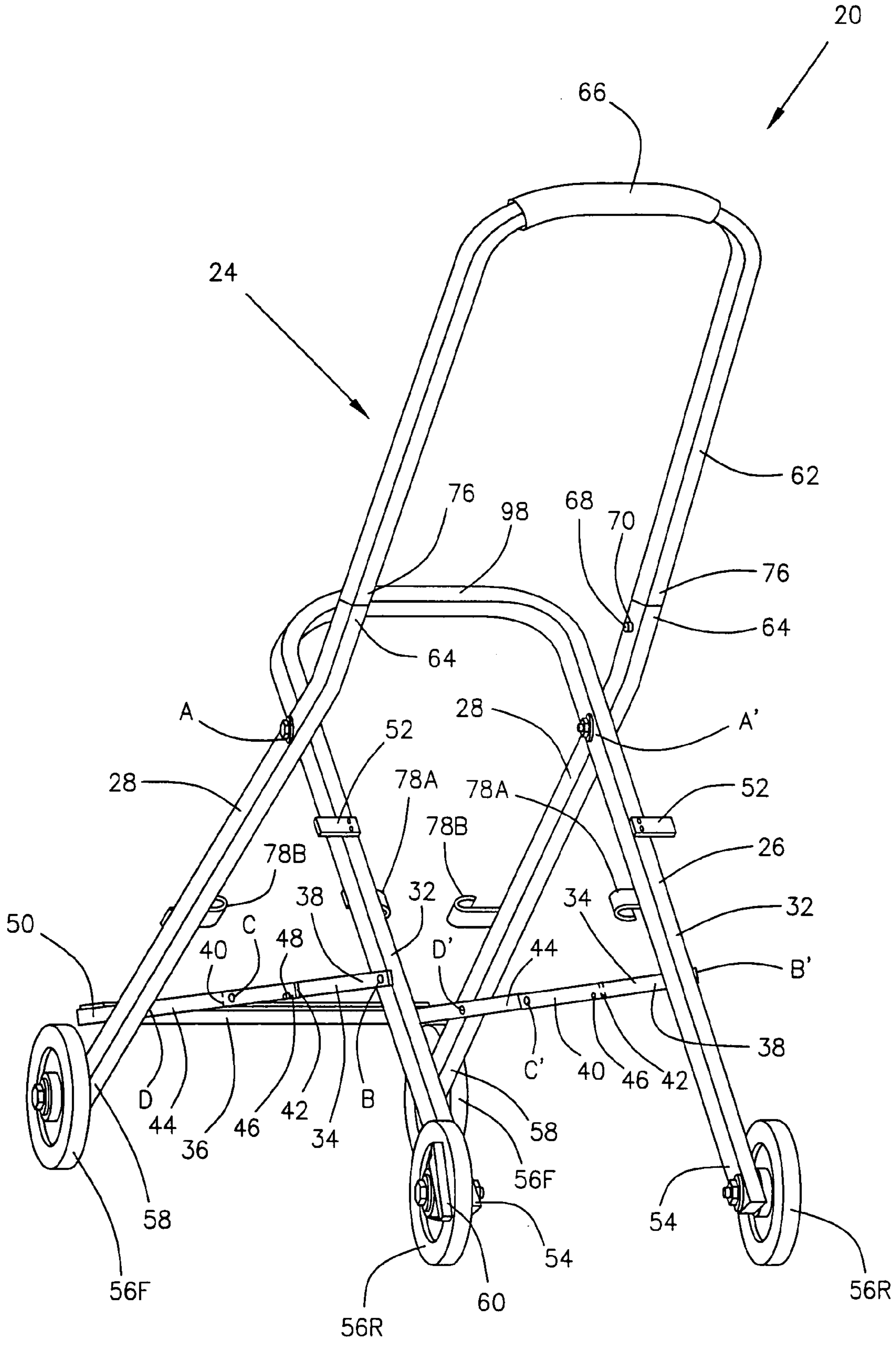
FIG. 1 is a perspective view of a walking aid constructed in accordance with a preferred embodiment of the present invention.

Referring now to the drawings and initially to FIG. 1, there is illustrated a walking aid 20 constructed in accordance with a preferred embodiment of the present invention. The present invention is a strong, light weight walking aid 20 that can be used to assist a person in walking and, when equipped with an optional seat 22, can be used as a seat by a person enabling them to sit on the walking aid 20.

The walking aid 20 is shown in FIG. 1 in an in use configuration or in use position 24. The walking aid 20 is provided with an inverted u-shaped member 26 pivotally secured via pivot points A and A' between a pair of front legs 28 so that the inverted u-shaped member 26 can pivot between the in use position 24 shown in FIG. 1 and the collapsed position 30, which is shown in side view in FIG. 4. The two legs 32 of the inverted u-shaped member 26 are the rear legs 32 of the walking aid 20.

The front legs 28 are preferably bent slightly forward near the upper ends 64 which allows the person who is using the walking aid 20 to stand closer to the walking aid 20, thereby making the walking aid 20 more stable and reducing the chance of falls.

The front and rear legs 28 and 32 are limited from separating further while in the in use position 24 by the combination of two rear pivoting arms 34 and a front u-shaped pivoting arm 36. A rear end 38 of each of the two rear pivoting arms 34 is pivotally secured to its associated rear leg 32 of the inverted u-shaped member 26 at second pivot points B and B' and an opposite front end 40 of each of the two rear pivoting arms 34 is pivotally secured to a rear end of one of the two extensions 44 of the front u-shaped pivoting arm 36 by means of a third pair of pivot points C and C'. Likewise, each of the two extensions 44 of the front u-shaped pivoting arm 36 is pivotally secured to its associated front leg 28 by means of a fourth pair of pivot points D and D'.

Figure 2:
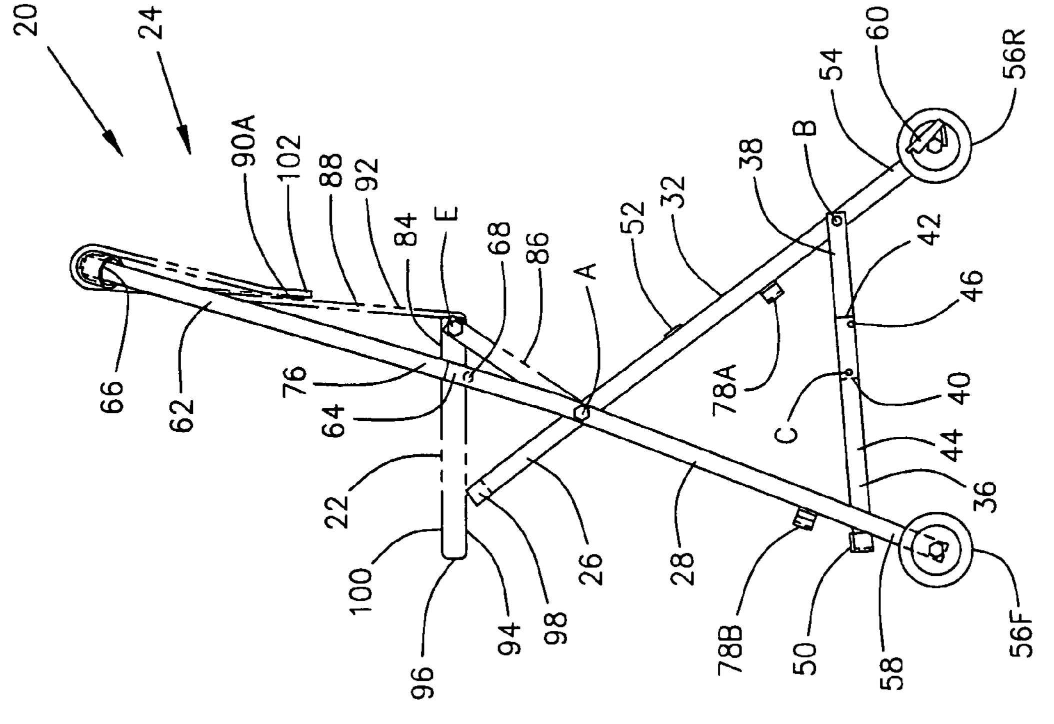
FIG. 2 is a left side view of the walking aid of FIG. 1 shown with an optional folding seat attached thereto.

As illustrated in FIGS. 1 and 2, an outwardly extending ear 46 provided on each of the two rear pivoting arms engages a notch 48 provided in each extension 44 of the front u-shaped pivoting arm 36 to lock the two rear pivoting arms 34 to the front u-shaped pivoting arm 36. To release the rear pivoting arms 34 from the front u-shaped pivoting arm 36 so that the walking aid 20 can be placed into its collapsed position 30, a front end 50 of the front unshaped pivoting arm 36 is pushed downward. Alternately, either the rear pivoting arms 34 or the extensions 44 on the front u-shaped pivoting arm 36 can be raised to place the walking aid 20 in its collapsed position 30. This causes the front and rear legs 28 and 32 to pivot at pivot points A and A' and causes the rear pivoting arms 34 and the front u-shaped pivoting arm 36 to pivot at pivot points B, B', C, C', D and D' until the front and rear legs 28 and 32 align with one another in the collapsed configuration 30 shown in FIG. 4. Two stops 52 are provided on the rear legs 32 to contain the extensions 44 on the front unshaped pivoting arm 36 and the rear pivoting arms 34 as they pivot into the nested or collapsed configuration 30.

The walking aid 20 can be moved from the collapsed configuration 30 back to the in use configuration 24 by simply pushing upward on the front end 50 of the front u-shaped pivoting arm 36 until the ears 46 on the two rear pivoting arms 34 once again engage their associated notches 48 provided on the extensions 44 of the front u-shaped pivoting arm 36, thereby again locking the walking aid 20 into its in use position 24.

Figure 4:
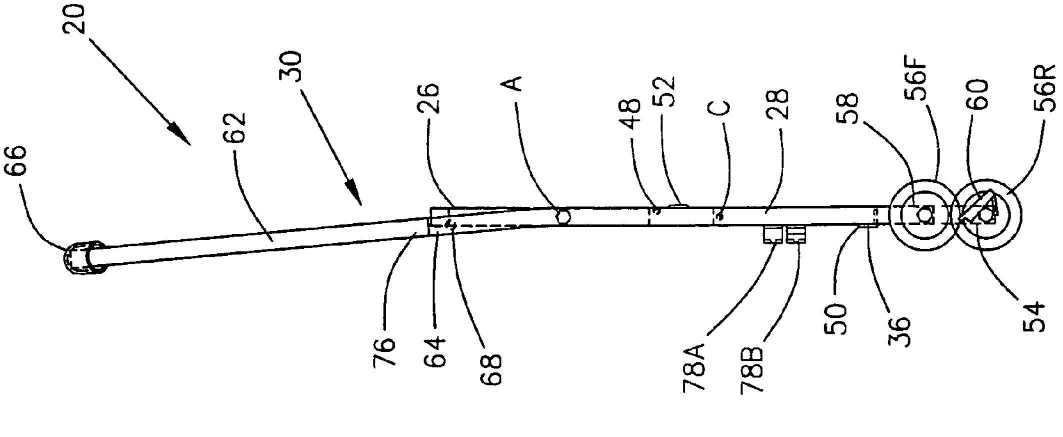
FIG. 4 is a left side view of the walking aid of FIG. 1 shown in its collapsed configuration.

A lower ends 54 of each of the two rear legs 32 is provided with a rotatable rear wheel 56R for engaging the ground when the walking aid 20 is in the in use position 24, and a lower end 58 of each of the front legs 28 is provided with a rotatable front wheel 56F for engaging the ground when the walking aid 20 is in the in use position 24. As illustrated in FIG. 4, the front wheels 56F are slightly higher that the rear wheels 56R when the walking aid 20 is in its collapsed configuration 30 so that the wheels 56F and 56R do not interfere with each other as the walking aid 20 is moved between its in use position 24 and its collapsed position 30.

As illustrated in FIGS. 1 and 4, the invention may optionally include a wheel braking mechanism 60 on the rear wheels 56R, such as the centrifugal activated braking mechanism illustrated. Although the braking mechanism 60 is shown only on the rear wheels 56R in the drawings, the invention is not so limited, and braking mechanisms 60 may be provided on some or all of the wheels 56R and 56F. Also, the invention is not limited to the specific centrifugal activated braking mechanism illustrated but may employ any suitable type of braking mechanism 60.

A detachable handle 62 is telescopically attached to the upper ends 64 of the two front legs 28 of the walking aid 20. The handle 62 is an inverted u-shape and is provided with a padded grip 66 to insure a secure grip on the handle 62 by the person using the walking aid 20. As illustrated in FIG. 1, the handle 62 is removably attached to the front legs 28 by means of depressible detents 68 that lock into detent openings 70 provided in the upper ends 64 of the front legs 28. A detent 68 is shown in detail in FIGS. 9, 10 and 11. The detent 68 is preferably provided with a spring 72 or other suitable means for biasing the detent 68 outward. The handle 62 can be detached from the front legs 28 by first depressing the detents 68 and then sliding the handle 62 upward.

Likewise, the handle 62 can be reattached to the front legs 28 by first depressing the detents 68 and then sliding the handle 62 downward until the detents 68 again enter their associated detent openings 70.

Figure 8:
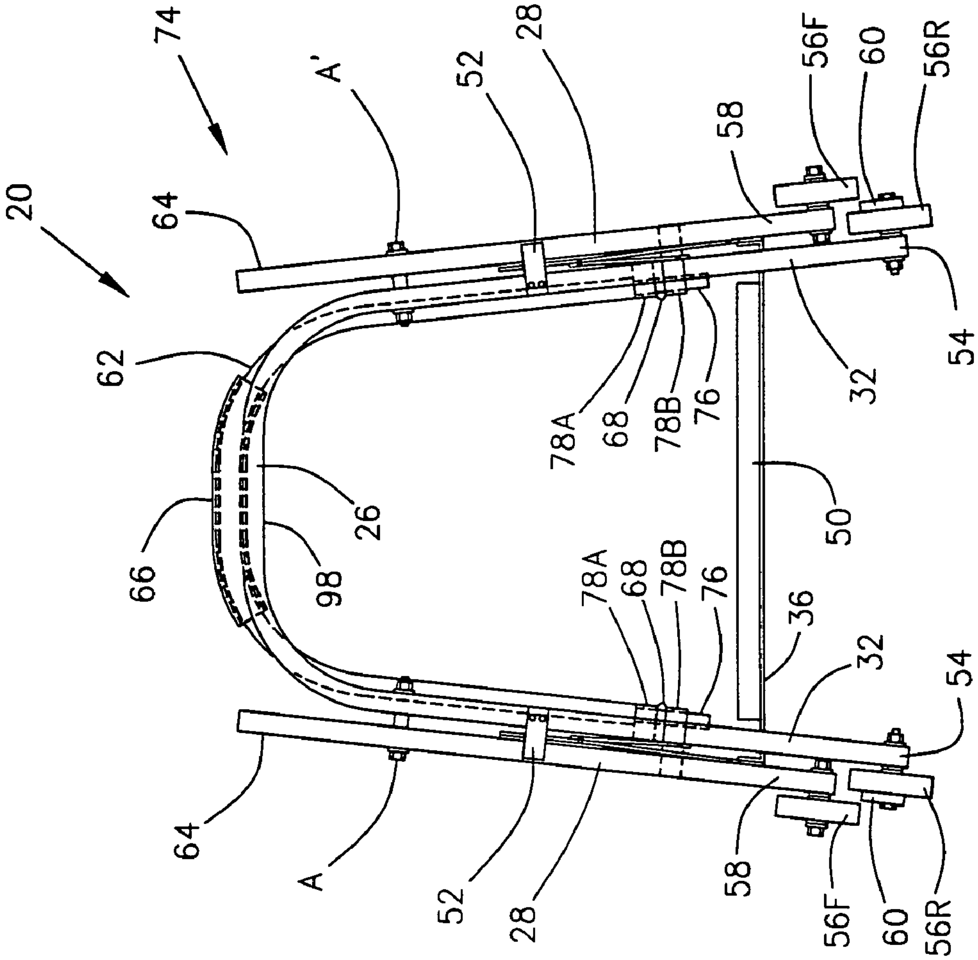
FIG. 8 is a rear view of the walking aid of FIG. 7.
Figure 7:
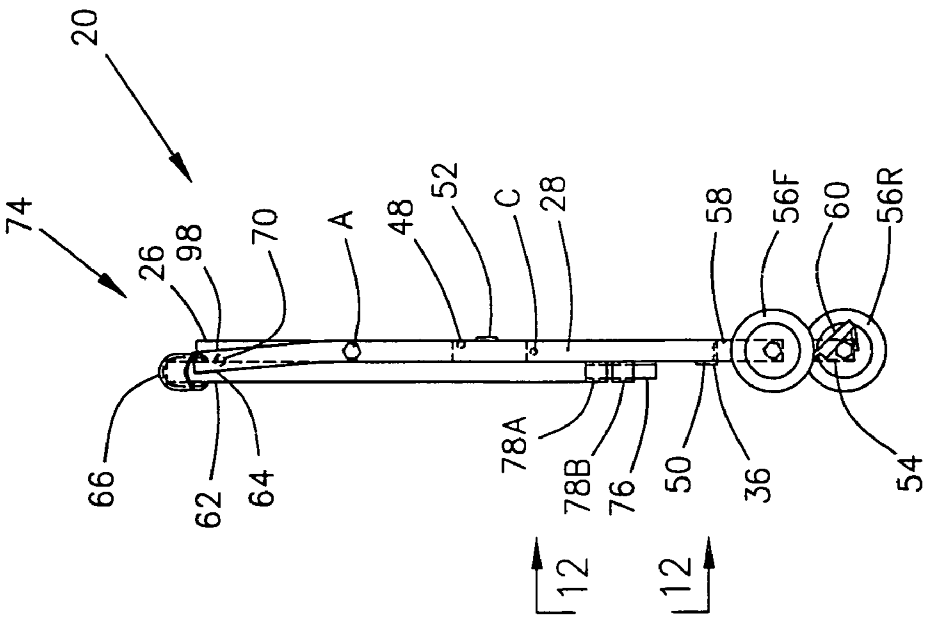
FIG. 7 is a left side view of the walking aid of FIG. 4 shown in its storage configuration.
Figure 13:
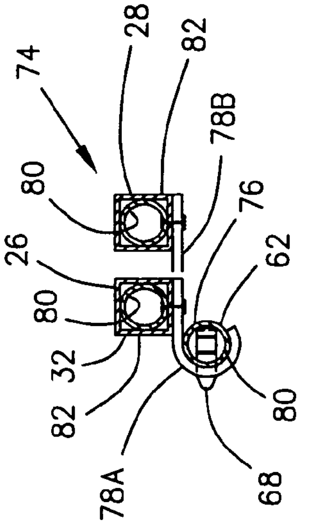
FIG. 13 is a cross sectional view taken along line 13-13 of FIG. 12.
Figure 12:
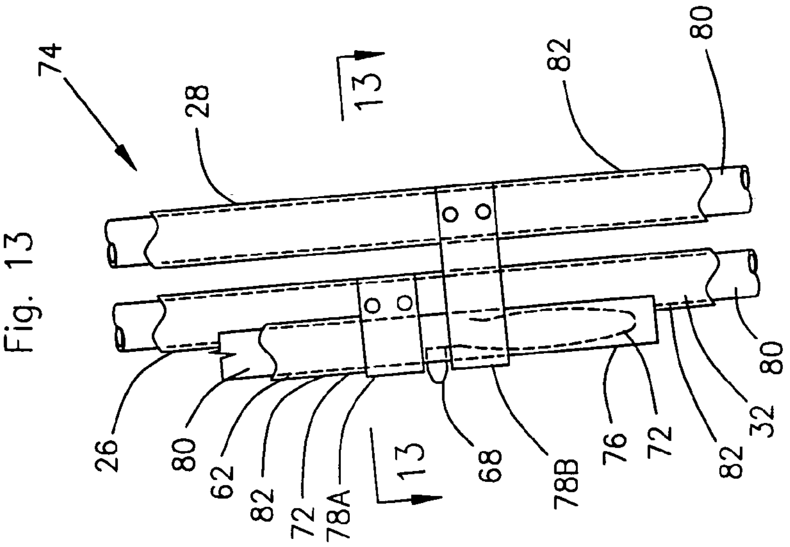
FIG. 12 is an enlarged front view of taken along line 12-12 of FIG. 7.

Once the handle 62 has been removed from the front legs 28, it can be used to secure the walking aid in its storage position 74, as illustrated in FIGS. 7 and 8. Referring now to FIGS. 12 and 13, to place the handle 62 in the storage position 74, the detents 68 are first depressed and then both ends 76 of the handle 62 are simultaneously inserted through pairs of J-shaped locking receivers or members 78A and 78B provided on the rear and front legs 32 and 28, respectively. Once the detents 68 have passed through the upper J-shaped locking member 78A of each pair, the detents 68 will spring outward and come to rest between the spaced apart upper and lower J-shaped locking member 78A and 78B of the pairs, thereby locking the handle 62 between the pairs of J-shaped locking members 78A and 78B. The J-shaped locking members 78A and 78B also serve to contain or nest the extensions 44 on the front u-shaped pivoting arm 36 and the rear pivoting arms 34 when they are pivoted into the collapsed configuration 30.

Also as illustrated in FIGS. 12 and 13, the upper J-shaped locking member 78A of each pair is provided on a rear leg 32 and the lower J-shaped locking member 78B of that pair is provided on an associated front leg 28 so that when the J-shaped locking members 78A and 78B are aligned and the handle 62 is inserted through them, the walking aid 20 is locked in its storage position 74 by the handle 62. Once the walking aid 20 is locked in its storage position 74 by the handle 62, the legs 28 and 32 can not pivot relative to each other until the handle 62 is once again removed from between the pairs of J-shaped locking members 78A and 78B. This is done by first depressing the detents 68 and then pulling the handle 62 upward so that it disengages from the pairs of J-shaped locking members 78A and 78B.

Figure 11:
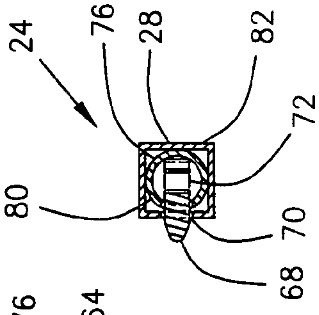
FIG. 11 is a cross sectional view taken along line 11-11 of FIG. 9.
Figure 10:
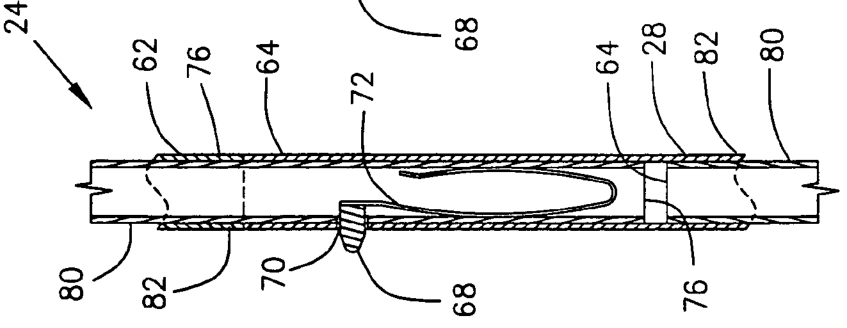
FIG. 10 is a cross sectional view taken along line 10-10 of FIG. 9.
Figure 9:
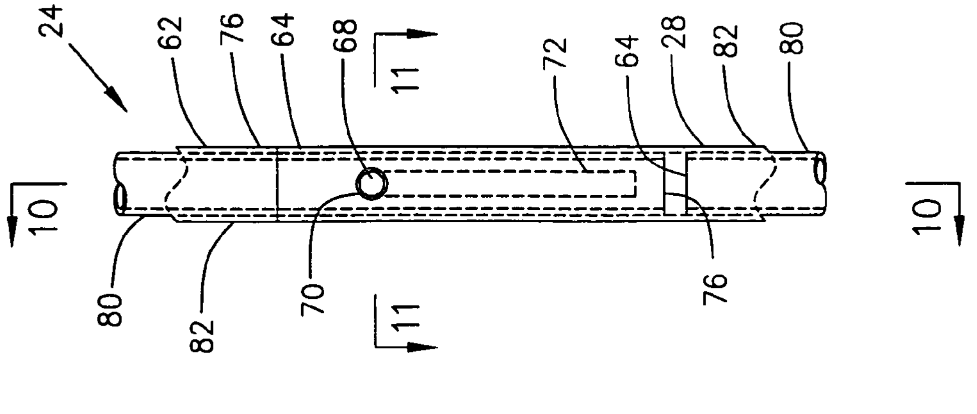
FIG. 9 is an enlarged view of the detent taken along line 9-9 of FIG. 3.

Referring to FIGS. 9, 10, 11, 12 and 13, each the structural members, i.e. the legs 28 and 32 and the handle 62, of the walking aid 20 are each preferably constructed of a double tube frame, i.e. internal round aluminum tubing 80 enclosed within external square aluminum tubing 84, to make the walking aid 20 strong without adding excess weight. Use of a double tube frame and making either the round tube 80 or the square tube 84 shorter than the other tube at the ends 76 and 64 allows the handle 62 to be telescopically received in the front legs 28, as shown in FIGS. 9, 10 and 11, and allows the handle 62 to insert into the J-shaped locking members 78A and 78B, as shown in FIGS. 12 and 13. However, the invention is not so limited and the invention can be constructed without use of a double tube frame and can be constructed of any suitable type of material.

Figure 3:
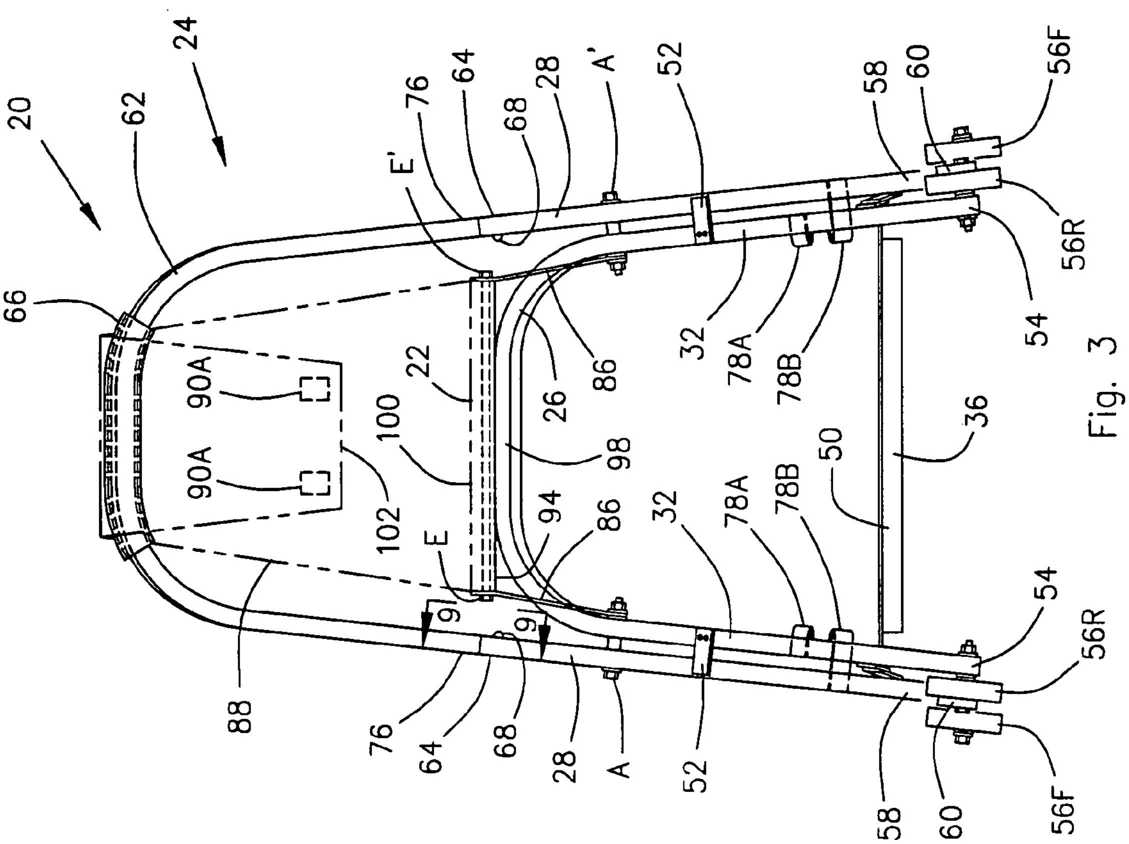
FIG. 3 is a rear view of the walking aid with optional folding seat of FIG. 2.
Figure 6:
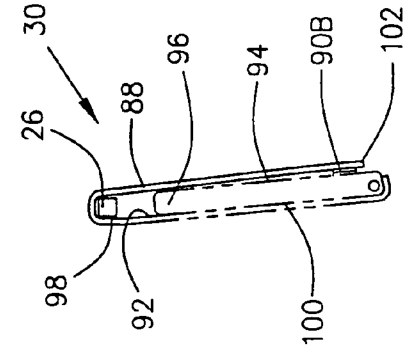
FIG. 6 is a cross sectional view of the optional folding sear of FIG. 5 shown in its collapsed configuration.
Figure 5:
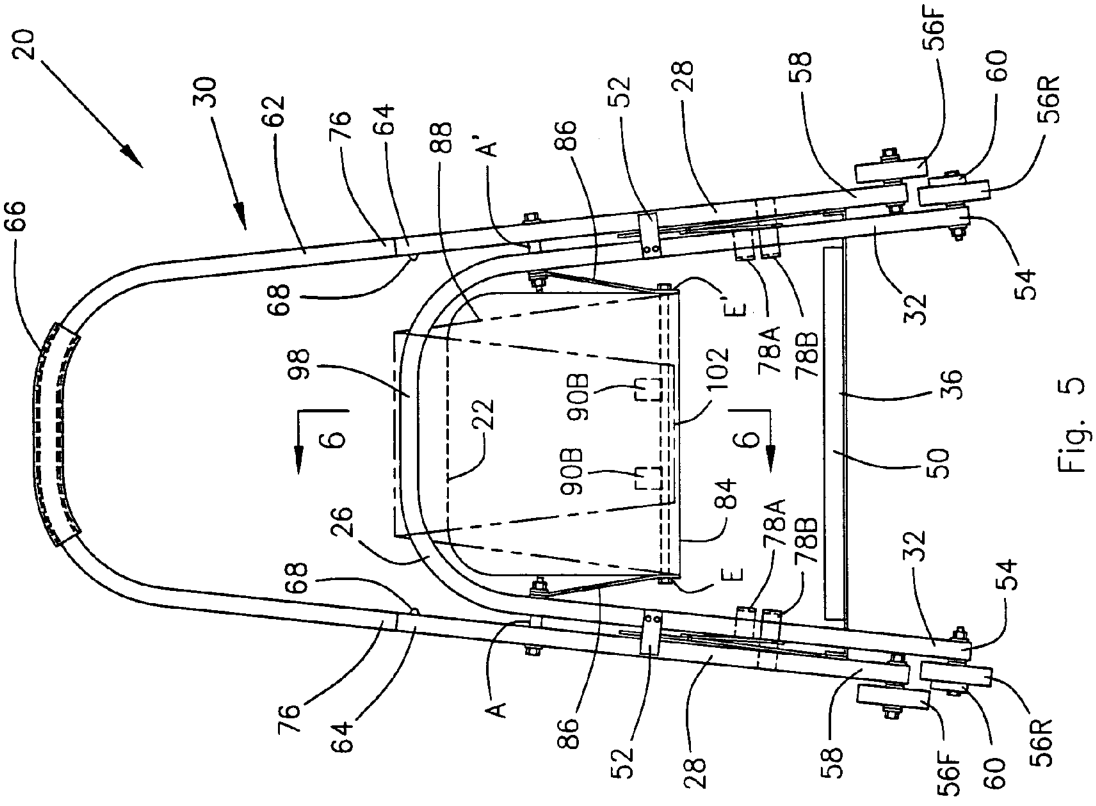
FIG. 5 is a rear view of the walking aid with optional folding seat of FIG. 3 shown in its collapsed configuration.

Referring now to FIGS. 2, 3, 5, and 6 an optional seat 22 can be provided on the walking aid 20 to allow a person to be seated on the walking aid 20. FIGS. 2 and 3 show the seat 22 in the in use position 24 and FIGS. 5 and 6 show the seat in its stored position 74. In the in use position 24, the rear 84 of the seat 22 is supported by a pair of seat support arms 86 and by a flexible fabric back 88 of the seat 22 that is secured to the rear 84 of the seat 22 and extends over the handle 62 and is secured by first hook and loop fasteners 90A to its own rear side 92. Each of the seat support arms 86 is pivotally attached on one end to fifth pivot points E and E' provided on the rear 84 of the seat 22, and attached on an opposite end to the first pivot points, A and A' respectively. Also, in the in use position 24, a bottom surface 94 of a front end 96 of the seat 22 rests on and is supported by an upper end 98 of the inverted u-shaped member 26. An opposite top surface 100 of the seat 22 is available for a person to sit on.

In order to move the walking aid 20 with an attached seat 22 from its in use position 24 to its collapsed position 30 or to its storage position 74, the flexible fabric back 88 of the seat 22 must first be detached from itself by disengaging the first hook and loop fasteners 90A that secures the free end 102 of the flexible fabric back 88 to its own rear side 92. This allows the flexible fabric back 88 to disengage the handle 62, thereby allowing the seat support arms 86 and the seat 22 to pivot backward and downward. Then the walking aid 20 can be moved into its collapsed position 30 as previously described.

After the walking aid 20 has been moved into its collapsed position 30, the flexible fabric back 88 can be pulled forward toward the top surface 100 of the seat 22, then over the upper end 98 of the inverted unshaped member 26 and finally the free end 102 of the flexible fabric back 88 can be secured to the bottom surface 94 of the seat 22 via second hook and loop fasteners 90B to thereby secure the seat 22 in the collapsed position 30 or in the storage position 74. The seat 22 can be moved back into its in use position 24 by reversing these steps.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A walking aid comprising:

an inverted u-shaped member having two legs that form the rear legs of a walking aid, two front legs pivotally secured to said inverted u-shaped member so that the front legs pivot forward from the rear legs when the walking aid is in an in use position, said front legs pivotally secured to two extensions provided on a front u-shaped pivoting arm, a rear end of each extension pivotally secured to one end of an associated pivoting arm, opposite ends of each pivoting arm pivotally secured to one of the two legs of the inverted u-shaped member so that the pivoting arms and the front u-shaped pivoting arm jointly limit the distance that the front legs can pivot away from the rear legs, an inverted u-shaped handle, ends of an inverted u-shaped handle removably secured to an upper end of each front leg, and the inverted u-shaped member that forms the two rear legs and the two front legs are pivotally secured together and secured with the pivot arms so that the frame of the walking aid is the thickness of only one leg when fully folded together in a closed parallel configuration and only the thickness of one leg and the handle when folded into its parallel storage configuration in which the handle locks the walking aid closed.

2. A walking aid according to claim 1 further comprising:

said unshaped handle removably secured to an upper end of each front leg by means of an outwardly biased detent provided in the handle that engages a detent opening provided in the upper end of each of the front legs.

3. A walking aid according to claim 1 further comprising:

said upper ends of the front legs bent slightly forward out of straight alignment.

4. A walking aid according to claim 1 further comprising:

a padded grip provided on the handle.

5. A walking aid according to claim 1 further comprising:

a wheel provided at the lower end of each of the front and back legs.

6. A walking aid according to claim 1 further comprising:

stops provided on the rear legs to contain the extensions on the front unshaped pivoting arm and the rear pivoting arms as they pivot into the nested and collapsed configuration.

7. A walking aid according to claim 1 further comprising:

a folding seat pivotally secured at a rear of the seat to one end of seat support arms, opposite ends of each seat support arm pivotally secured to said legs, a front end of said seat engaging an upper end of said inverted unshaped member, and a flexible back secured to the rear of the seat, said flexible back removably extending over the handle and removably securing to its own rear side.

8. A walking aid according to claim 1 further comprising:

said legs and said handle each constructed by employing one inside tube located inside an outside tube.

9. A walking aid according to claim 2 further comprising:

handle storage means provided on each leg to store the handle and to lock the legs in a parallel storage configuration.

10. A walking aid according to claim 5 further comprising:

braking means provided on the wheels of the back legs.

11. A walking aid according to claim 10 further comprising:

braking means provided on the wheels of the front legs.

12. A walking aid according to claim 7 further comprising:

said flexible back removably secured to its own rear side by means of hook and loop fasteners.

13. A walking aid according to claim 7 further comprising:

means for removably securing a free end of the flexible back to a bottom surface of the seat after the flexible back has been wrapped around the top surface of the seat and around the upper end of the inverted unshaped member when the legs are in the parallel storage configuration.

14. A walking aid according to claim 13 further comprising:

said means for removably securing a free end of the flexible back to a bottom surface of the seat comprising hook and loop fasteners.

15. A walking aid according to claim 8 further comprising:

each said inside tube being a round tube, and each said outside tube being a square tube.

16. A walking aid according to claim 15 further comprising:

each said round tube and each said square tube being constructed of aluminum tubing.

17. A walking aid comprising:

an inverted u-shaped member having two legs that form the rear legs of a walking aid, two front legs pivotally secured to said inverted u-shaped member so that the front legs pivot forward from the rear legs when the walking aid is in an in use position, said front legs pivotally secured to two extensions provided on a front u-shaped pivoting arm, a rear-end of each extension pivotally secured to one end of an associated pivoting arm, opposite ends of each pivoting arm pivotally secured to one of the two legs of the inverted u-shaped member so that the pivoting arms and the front u-shaped pivoting arm jointly limit the distance that the front legs can pivot away from the rear legs, an inverted unshaped handle, ends of an inverted u-shaped handle removably secured to an upper end of each front leg, handle storage means provided on each leg to store the handle and to lock the legs in a parallel storage configuration, said u-shaped handle removably secured to an upper end of each front leg by means of an outwardly biased detent provided in the handle that engages a detent opening provided in the upper end of each of the front legs, and said handle storage means comprising a receiver provided on each leg for receiving the ends of the handle, the receivers provided on the front legs being aligned and spaced apart vertically from the receivers provided on their associated rear legs when the legs are in a parallel storage configuration so that the detents on the ends of the handle can insert between the receivers of one front leg and one rear leg when the ends of the handle are inserted into the receivers.

18. A walking aid comprising:

an inverted u-shaped member having two legs that form the rear legs of a walking aid, two front legs pivotally secured to said inverted u-shaped member so that the front legs pivot forward from the rear legs when the walking aid is in an in use position, means for limiting the distance that the front legs can pivot away from the rear legs, an inverted u-shaped handle, means for removably securing ends of an inverted u-shaped handle to upper ends of the front legs, handle storage means provided on each leg to store the handle when it is removed from the upper ends of the front legs and to lock the legs in a parallel storage configuration, and the inverted u-shaped member that forms the two rear legs and the two front legs are pivotally secured together and secured with the means for limiting the distance that the front legs can pivot away from the rear legs so that the frame of the walking aid is the thickness of only one leg when fully folded together in a closed parallel configuration and only the thickness of one leg and the handle when folded into its parallel storage configuration in which the handle locks the walking aid closed.

19. A walking aid according to claim 18 further comprising:

a wheel provided at the lower end of each of the front and back legs.

20. A walking aid according to claim 18 further comprising:

a folding seat pivotally secured at a rear of the seat to one end of seat support arms, opposite ends of each seat support arm pivotally secured to said legs, a front end of said seat engaging an upper end of said inverted unshaped member as a means of support for the seat, a flexible back secured to the rear of the seat, and said flexible back removably extending over the handle to hold the seat in an in use position and removably extending around the seat and over an upper end of the inverted unshaped member to hold the seat in a storage position.

* * * * *